(12) United States Patent
Sawdon

(10) Patent No.: US 6,735,944 B2
(45) Date of Patent: May 18, 2004

(54) AIR TO OIL INTENSIFIER

(75) Inventor: Edwin G. Sawdon, St. Clair, MI (US)

(73) Assignee: BTM Corporation, Marysville, MI (US)

( * ) Notice: Subject to any disclaimer, the term of this patent is extended or adjusted under 35 U.S.C. 154(b) by 0 days.

(21) Appl. No.: 10/192,144

(22) Filed: Jul. 10, 2002

(65) Prior Publication Data

US 2004/0006983 A1 Jan. 15, 2004

(51) Int. Cl.[7] .................................................. F15B 7/00
(52) U.S. Cl. .............................. 60/560; 60/563; 60/565
(58) Field of Search ........................ 60/560, 563, 565, 60/593, 576, 577, 591

(56) References Cited

U.S. PATENT DOCUMENTS

| | | |
|---|---|---|
| 4,271,671 A | 6/1981 | Smeets |
| 4,300,351 A | 11/1981 | Grullmeier |
| 4,993,226 A | 2/1991 | De Kok |
| 5,107,681 A | 4/1992 | Wolfbauer, III |
| 5,218,821 A | 6/1993 | Beneteau |
| 5,247,871 A | 9/1993 | Brasca et al. |
| 5,265,423 A | 11/1993 | Glaser |
| 5,429,036 A | 7/1995 | Latos |
| 5,526,644 A | 6/1996 | Brieschke |
| 5,649,424 A * | 7/1997 | Valavaara .................. 60/56 |

OTHER PUBLICATIONS

U.S. patent application Ser. No. 10/243,865, Sawdon, filed, Sep. 13, 2002.
Tox Pressotechnik LLC product brochure, 12 pages, date unknown.
Multicyl product brochure, 8 pages, dated Jul. 1999.
Aries Engineering Company Inc. product brochure, 5 pages, date unknown.
Farger & Joosten product brochure, 4 pages, dated Sep. 1999.
Farger & Joosten product brochure, 2 pages, dated Mar. 1999.
Alfamatic product information from website, 2 pages.
G.P.A. Italiana S.p.A. product information from website, 2 pages.
Attexor Inc. product brochure, 2 pages, dated unknown.
OHMA Systems Inc. product brochure, 44 pages, dated 1995.

* cited by examiner

Primary Examiner—Edward K. Look
Assistant Examiner—Michael Leslie
(74) Attorney, Agent, or Firm—Harness, Dickey & Pierce, P.L.C.

(57) ABSTRACT

A pressure intensifier for generating relatively large output force includes a piston driven in an advancing and a retracting direction. The piston provides a relatively large cross-sectional area for a pressurized fluid to act during the retracting stroke. As such, relatively large, heavy, tools may be returned to an elevated position without the use of external force-producing devices.

13 Claims, 10 Drawing Sheets

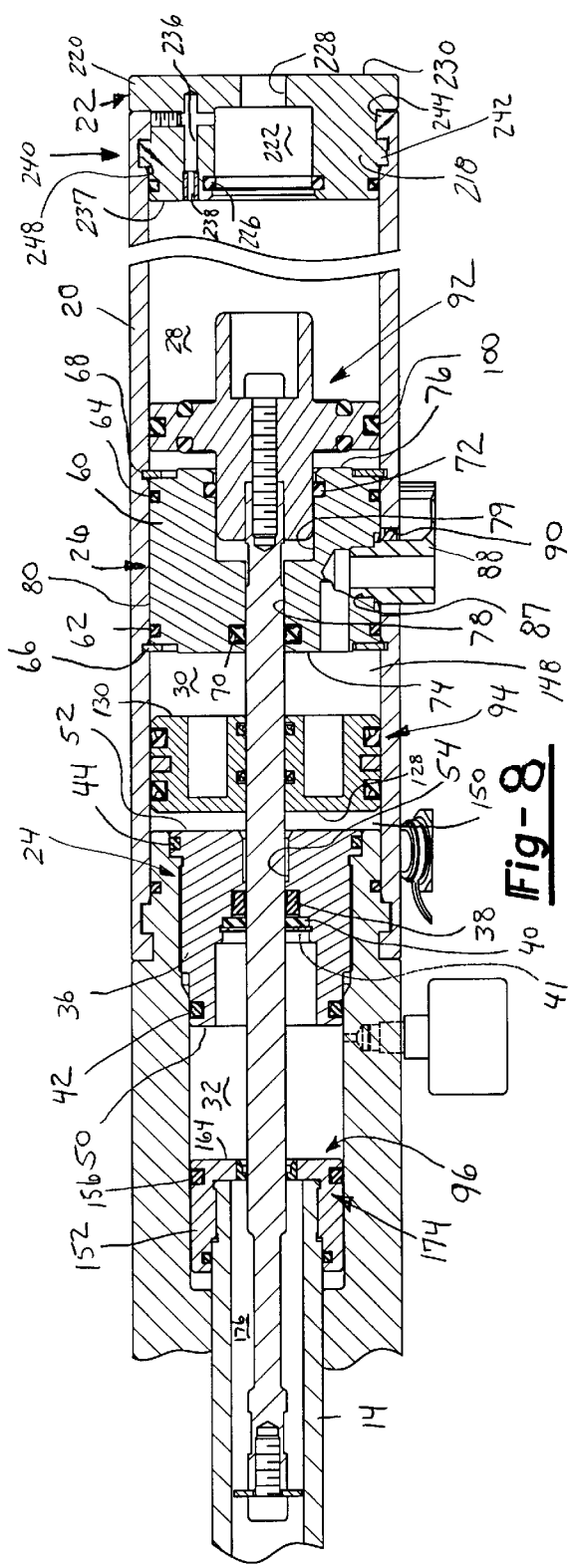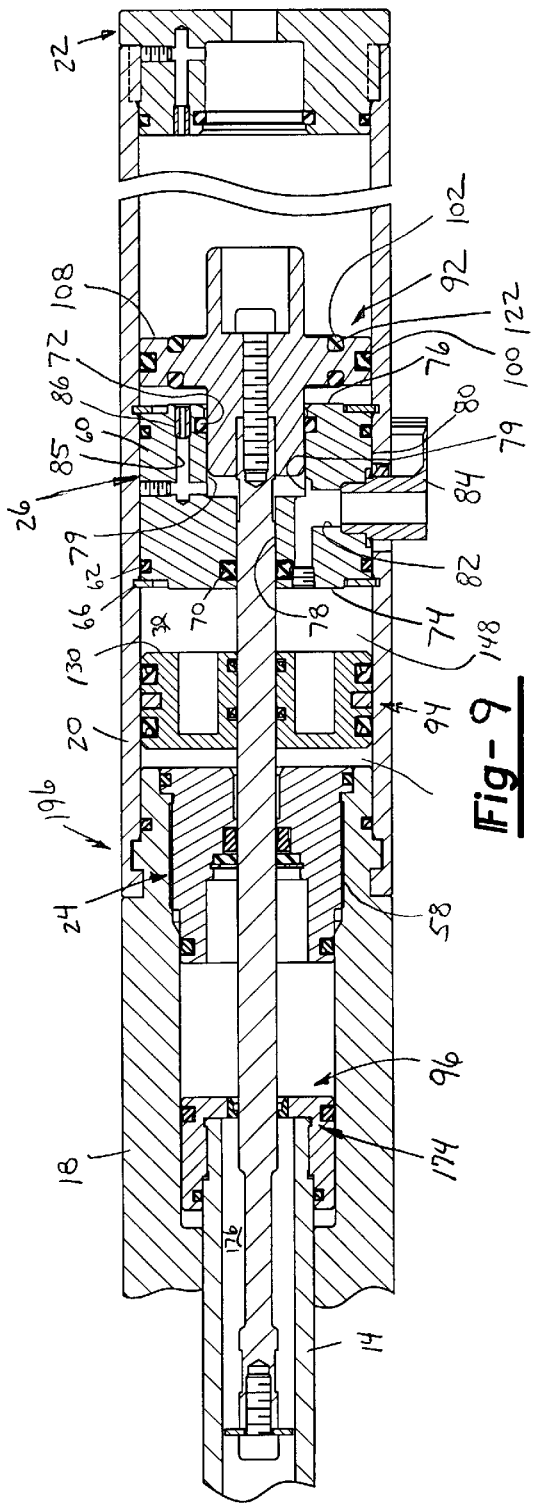

AIR TO OIL INTENSIFIER

BACKGROUND AND SUMMARY OF THE INVENTION

The present invention relates generally to a force producing apparatus and, more particularly, to an air to oil pressure intensifier for providing relatively large forces to machines such as clamps, grippers, presses and punches.

Many systems utilize the basic principle of inserting a rod into an enclosed oil-filled chamber to produce force. One known system injects a large volume of hydraulic fluid behind a working piston to advance a rod into contact with a work piece. The rod is further inserted into a closed chamber to obtain a force multiplication equal to the ratio of the area of working piston to the area of the end of the rod.

Because large forces are generated by air to oil intensifiers, the working piston is often attached to a tool which may weigh several hundred pounds or more. Returning heavy tools to an elevated or beginning position has become a significant design challenge. Some devices accomplish the task of returning the tool by using an additional piston powered by air. The piston must be of sufficient diameter to produce the requisite force to lift the tool. Devices incorporating external additional pistons are very costly, difficult to package within work cells having limited space and require special air circuits and controls to operate the multiple piston arrangement. These systems are typically large in length and may only be shortened by stacking the units side by side.

Accordingly, it would be beneficial to provide a compact, lightweight pressure intensifier capable of lifting heavy tooling without the use of an external assist cylinder. A device minimizing the need for external valving and circuit controllers required for operation would also be of benefit.

The present invention provides a pressure intensifier for providing relatively large output forces using an air or hydraulic force amplification system. According to one aspect of the present invention, a rod is driven into a sealed chamber of substantially incompressible fluid to generate an output force.

According to another aspect of the present invention, a compact, lightweight pressure intensifier capable of lifting heavy tooling with the use of an external assist cylinder is provided. According to another aspect of the present invention, a first piston is selectively driven by a fluid power source to retract the piston from a previously force-intensified position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a cross-sectional view of the pressure intensifier taken along line 8—8 of FIG. 7;

FIG. 9 is a cross-sectional view of the pressure intensifier taken along line 9—9 of FIG. 7;

DETAILED DESCRIPTION OF THE PREFERRED EMBODIMENT

Figure 1:
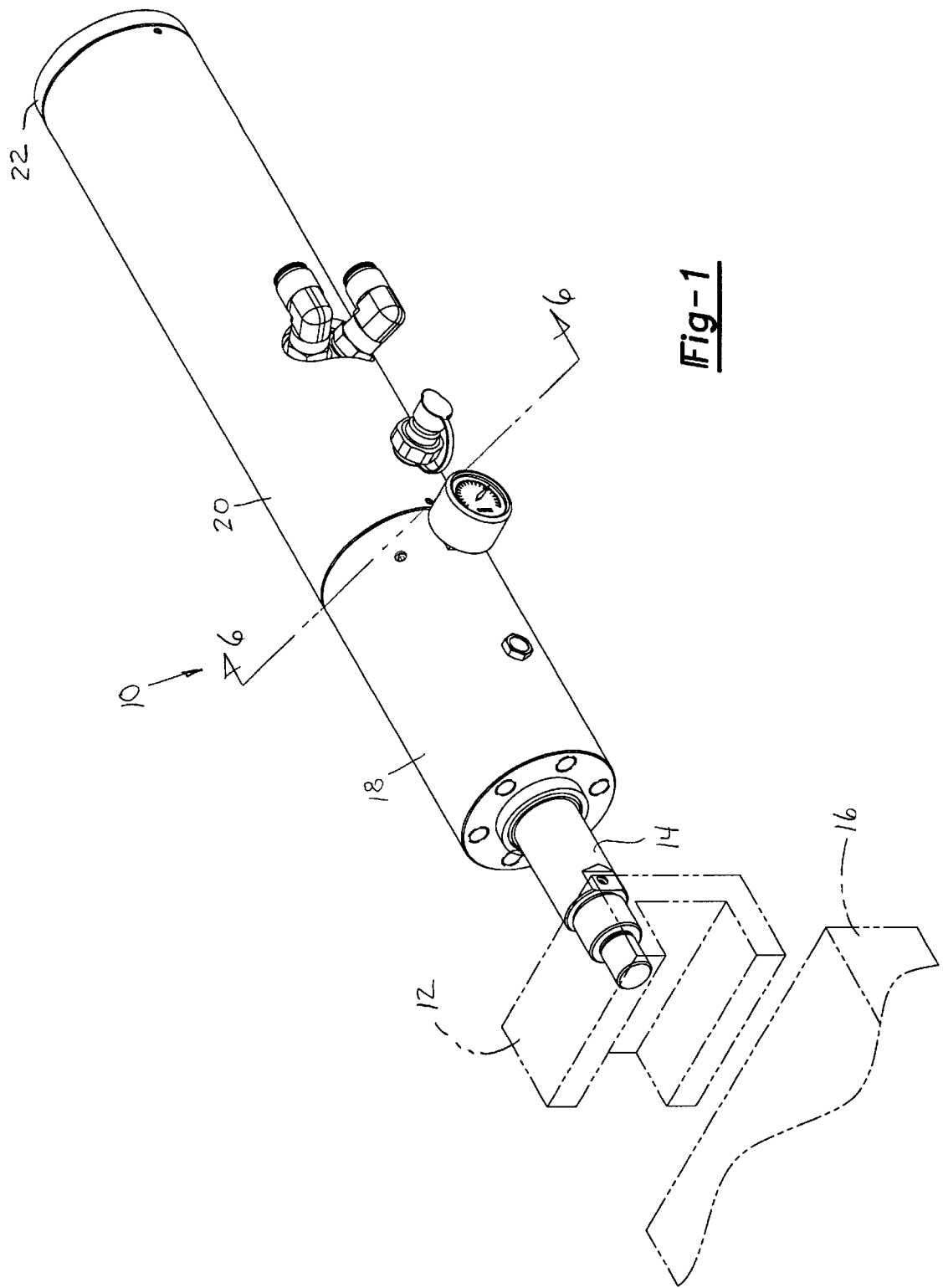
FIG. 1 is a perspective view of a pressure intensifier according to the principles of the present invention.
Figure 2:
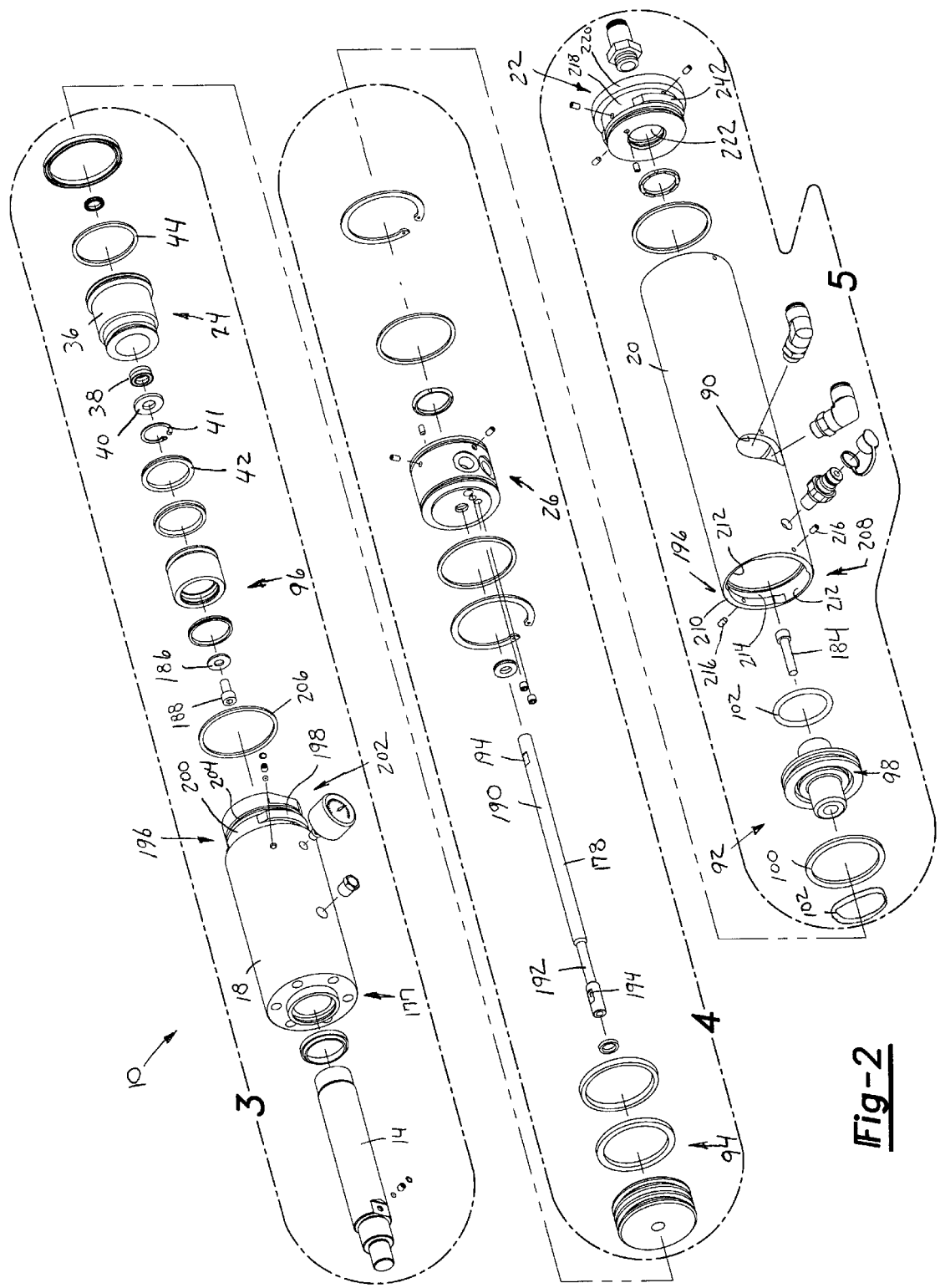
FIG. 2 is an exploded perspective view of the pressure intensifier shown in FIG. 1.

With reference to FIGS. 1 and 2, an air to oil pressure intensifier constructed in accordance with the teachings of the present invention is identified at reference numeral 10. Pressure intensifier 10 functions to provide a relatively large output force at a driven end using only compressed air at relatively low pressure (80 to 120 psi) as the power source. Typically, the driven end of the pressure intensifier is coupled to tooling such as a clamp half, a rivet hammer or a punch, collectively identified as a tool 12.

Pressure intensifier 10 operates by extending and retracting a ram 14 to place tool 12 into engagement with a work piece 16. As will be described in greater detail hereinafter, pressure intensifier 10 operates to rapidly translate tool 12 toward work piece 16 using relatively low force. Once tool 12 contacts work piece 16, pressure intensifier 10 generates a greatly multiplied force between tool 12 and work piece 16. On the return stroke, a piston with a relatively large working area within pressure intensifier 10 is pressurized to lift the heaving tooling in preparation for the next work cycle.

Pressure intensifier 10 includes a substantially cylindrical hollow front cylinder 18 coupled to a substantially cylindrical hollow rear cylinder 20. An end cap 22 closes one of the open ends of rear cylinder 20.

Figure 3:
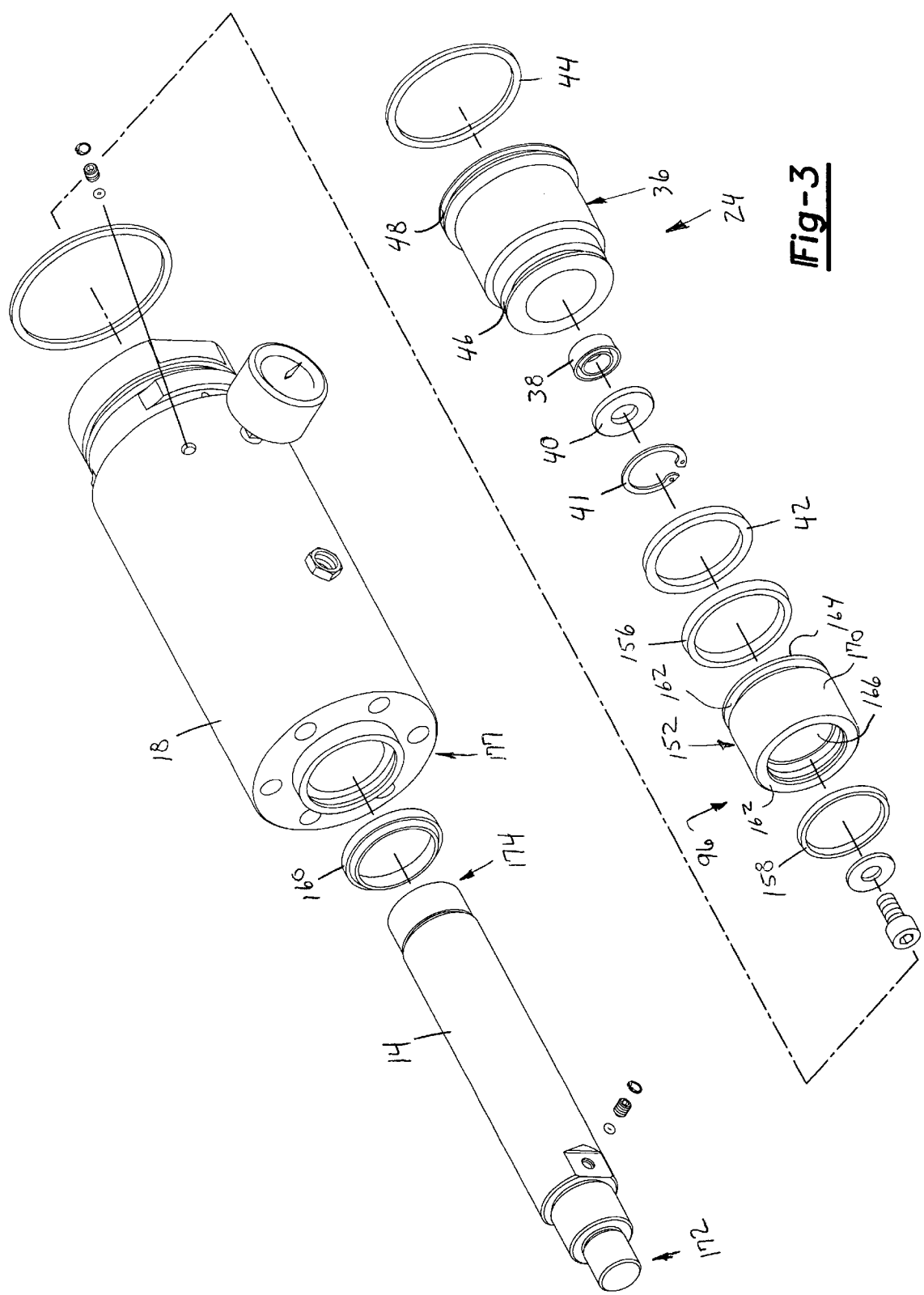
FIG. 3 is an enlarged perspective view of the encircled area of FIG. 2.

As shown in FIGS. 3, 8 and 9, a divider assembly 24 and a bulkhead assembly 26 divide the interior volume of pressure intensifier 10 into a first cavity 28, a second cavity 30 and a third cavity 32. Divider assembly 24 includes a divider 36, a high pressure seal 38, a seal retainer 40, a retaining ring 41, a front seal 42 and a rear seal 44.

Divider 36 is a generally hollow cylindrical member having a series of stepped cylindrical portions along its outside diameter as well as along its inside diameter. Specifically, divider 36 includes a first external groove 46 and a second external groove 48 for receipt of front seal 42 and rear seal 44, respectively. As best shown in FIGS. 8 and 9, divider 36 includes a front face 50, a rear face 52 and a passageway 54 extending therebetween. Passageway 54 includes a series of stepped portions 56 shaped to complement high pressure seal 38, seal retainer 40 and retaining ring 41. Accordingly, high pressure seal 38 is captured between divider 36 and retaining ring 41. Divider 36 is coupled to front cylinder 18 with an external thread 58.

Figure 4:
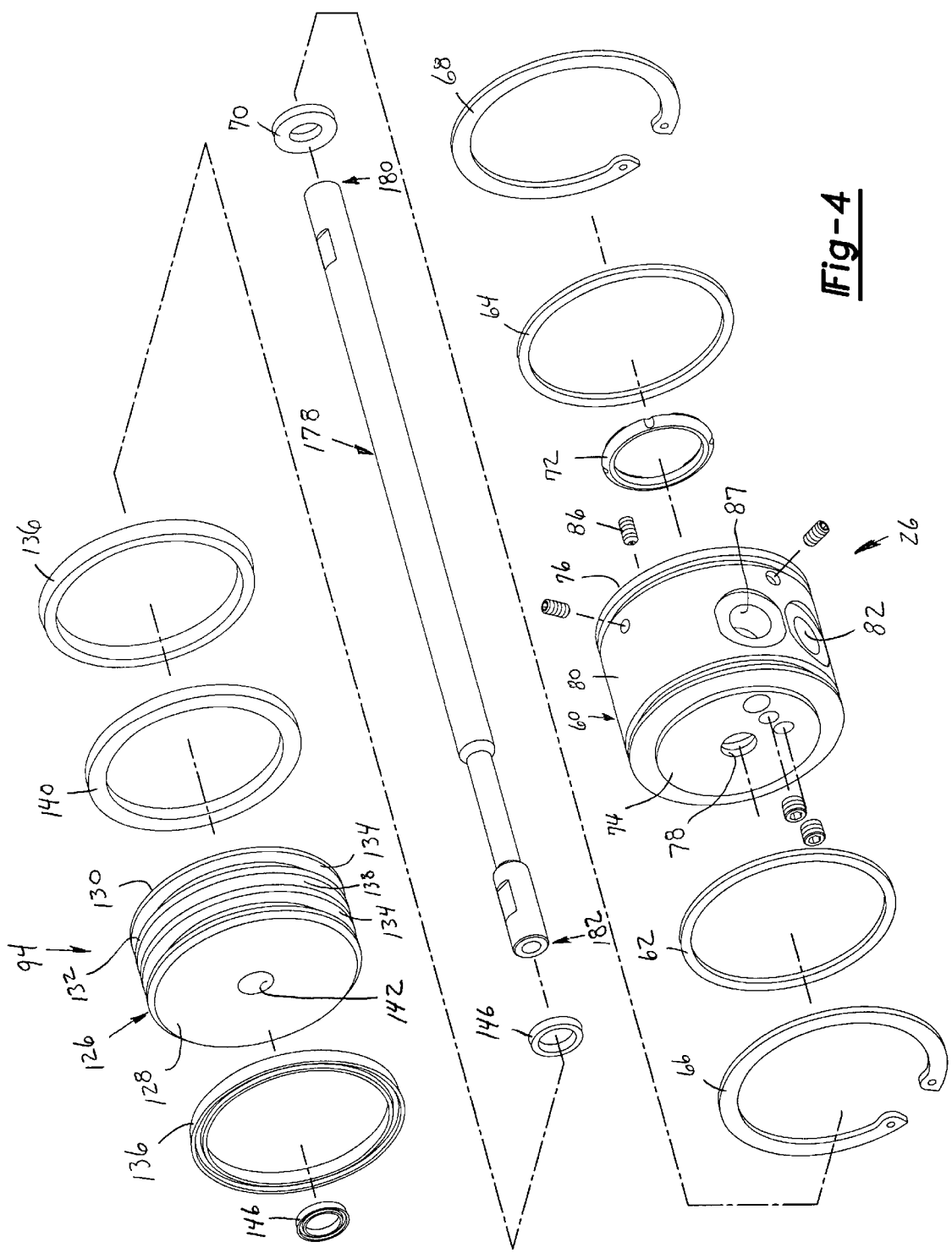
FIG. 4 is an enlarged perspective view of the encircled area of FIG. 2.

Bulkhead assembly 26 (FIG. 4) includes a bulkhead 60, a front seal 62, a rear seal 64, a front retaining ring 66, a rear retaining ring 68, a shaft seal 70 and an oil chamber cushioning seal 72. Bulkhead 60 is a substantially cylindrical member having a front face 74 and a rear face 76. Bulkhead 60 includes a passageway 78 extending from front face 74 to rear face 76. Passageway 78 of bulkhead 60 includes a counterbore 79 having oil chamber cushioning seal 72 positioned therein. Bulkhead 60 includes an outer surface 80. A first port 82 (FIG. 9) extends through bulkhead 60 from outer surface 80 to counterbore 79. A first fitting 84 is coupled to first port 82 to allow pressurized fluid to enter and exit first cavity 28. A passageway 85 interconnects counterbore 79 and first cavity 28. An orifice 86 is inserted within passageway 85 to restrict air from exiting first cavity 28 at a rapid rate, thereby acting as a damper against impact.

A second port 87 (FIG. 8) extends from outer surface 80 through bulkhead 60 and exits at front face 74. Accordingly, a second fitting 88 is coupled to second port 87 to allow pressurized fluid to enter and exit second cavity 30. Rear cylinder 20 includes an aperture 90 to allow first fitting 84 and second fitting 88 to access bulkhead 60.

Pressure intensifier 10 includes a first piston assembly 92, a second piston assembly 94 and a third piston assembly 96. First piston assembly 92 is positioned within first cavity 28. First piston assembly 92 is free to move axialy within first cavity 28 from a retracted position shown in FIG. 10 to an advanced position shown in FIG. 12.

First piston assembly 92 (FIG. 5) includes a first piston 98, a seal 100 and a pair of shocks 102. First piston 98 is a generally cylindrically-shaped member including a body 104, a front face 106, a rear face 108 and an outer surface 110. A front trunion 112 extends from front face 106. A rear trunion 114 extends axially from rear face 108. Front trunion 112 includes an outer cylindrical surface 116. Rear trunion 114 includes an outer cylindrical surface 118.

Front face 106 includes an annular groove 120 sized to receive one of shocks 102. Similarly, rear face 108 includes an annular groove 122 sized to receive another shock 102. Shocks 102 dampen the impact forces generated as first piston assembly 92 approaches end cap 22 or bulkhead 60. Outer surface 110 includes an annular groove 124 for receipt of seal 100. Seal 100 is positioned between body 104 and rear cylinder 20 to capture fluid within first cavity 28 on either side of seal 100.

Second piston assembly 94 (FIG. 4) includes a generally cylindrically-shaped piston 126 having a front face 128, a rear face 130 and an outer surface 132. Outer surface 132 includes a pair of spaced apart circumferential grooves 134 sized for receipt of a pair of seals 136. Outer surface 132 includes a retention groove 138 positioned between grooves 134 for capturing a ring 140. Preferably, ring 140 is constructed from a material capable of maintaining a magnetic charge. Piston 126 includes a substantially cylindrical bore 142 extending from front face 128 to rear face 130. Bore 142 includes a pair of seal grooves 144 for receipt of a pair of shaft seals 146.

Second piston assembly 94 is free to axially move within second cavity 30 to the extent divider assembly 24 and bulkhead assembly 26 allow. It should be appreciated that a portion 148 (FIG. 8) of second cavity 30 defined between rear face 130 of second piston 126 and front face 74 of bulkhead 60 contains a compressible fluid such as air. Second port 87 provides a conduit for supplying compressed air to portion 148 of second cavity 30.

Another portion 150 of second cavity 30 is defined by front face 128 of second piston 126 and rear face 52 of divider 36. Second portion 150 of second cavity 30 contains an incompressible fluid such as oil. Oil is also contained within the captured volume of third cavity 32 and third piston assembly 96.

Third piston assembly 96 (FIG. 3) includes a third piston 152, a ram 14, a cylinder seal 156, a ram seal 158 and a ram wiper 160. Third piston 152 is a generally cylindrically-shaped member having a front face 162, a rear face 164 and a stepped bore 166 extending therethrough. Cylinder seal 156 is positioned within a groove 168 located on an outer surface 170 of third piston 152.

Ram 14 is an elongated cylindrical member having a first end 172 and a second end 174. A pressure chamber 176 is formed within ram 14 and is shaped as a blind bore entering from second end 174. Ram seal 158 is positioned between ram 14 and third piston 152 to contain pressurized fluid within pressure chamber 176. Ram wiper 160 provides a line of defense from contaminants within the work environment. Ram wiper 160 is positioned at a front end 177 of front cylinder 18 in contact with ram 14.

A rod 178 (FIGS. 2 and 4) includes a first end 180 and a second end 182. First end 180 is coupled to first piston 98 via a fastener 184. Rod 178 extends through passageway 78 of bulkhead assembly 26, bore 142 of second piston 126, passageway 54 of divider 36 and stepped bore 166 of third piston 152. A washer 186 is positioned within pressure chamber 176 and coupled to the second end 182 of rod 178 with a threaded fastener 188.

Rod 178 includes a generally cylindrical body portion 190 having a first diameter and a generally cylindrical necked portion 192 having a diameter less than the diameter of body portion 190. Flats 194 are placed along the length of rod 178 to assist with the assembly of components.

To assemble pressure intensifier 10, first piston assembly 92, second piston assembly 94, third piston assembly 96, divider assembly 24 and bulkhead assembly 26 are positioned within front cylinder 18 and rear cylinder 20 as depicted in the Figures. Front cylinder 18 is coupled to rear cylinder 20 using a retention mechanism 196 best depicted in FIGS. 2, 6 and 9. Retention mechanism 196 includes a pair of lobes 198 radially extending from a cylindrical surface 200 located at a rear end 202 of front cylinder 18. Cylindrical surface 200 includes a groove 204 for receipt of a housing seal 206.

The complimentary portion of retention mechanism 196 is located at a front end 208 of rear cylinder 20. Front end 208 includes a lip 210 interrupted by two recesses 212 located 180 degrees apart from one another. Recesses 212 are shaped to compliment the profile of lobes 198. A slot 214 is positioned rearward of lip 210 and is sized to accept lobes 198 therewithin.

Figure 6:
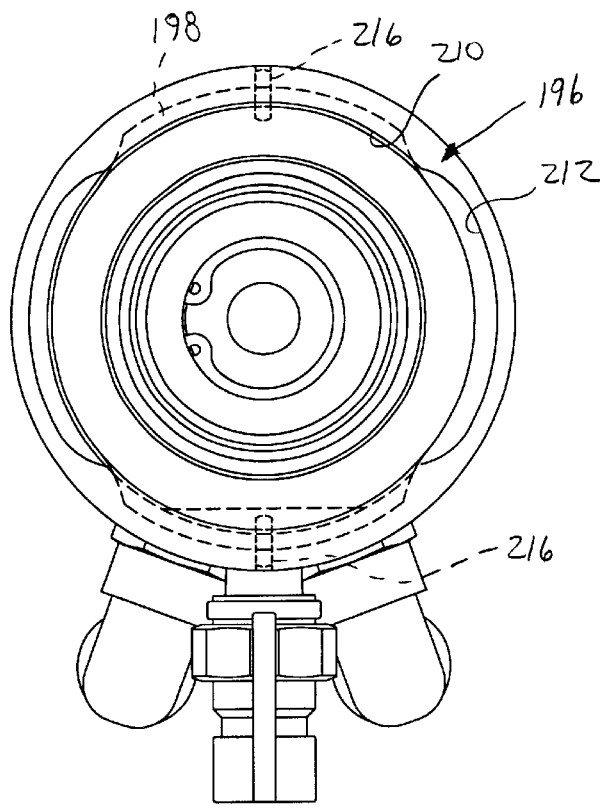
FIG. 6 is a cross-sectional view of the pressure intensifier taken along line 6—6 of FIG. 1.
Figure 7:
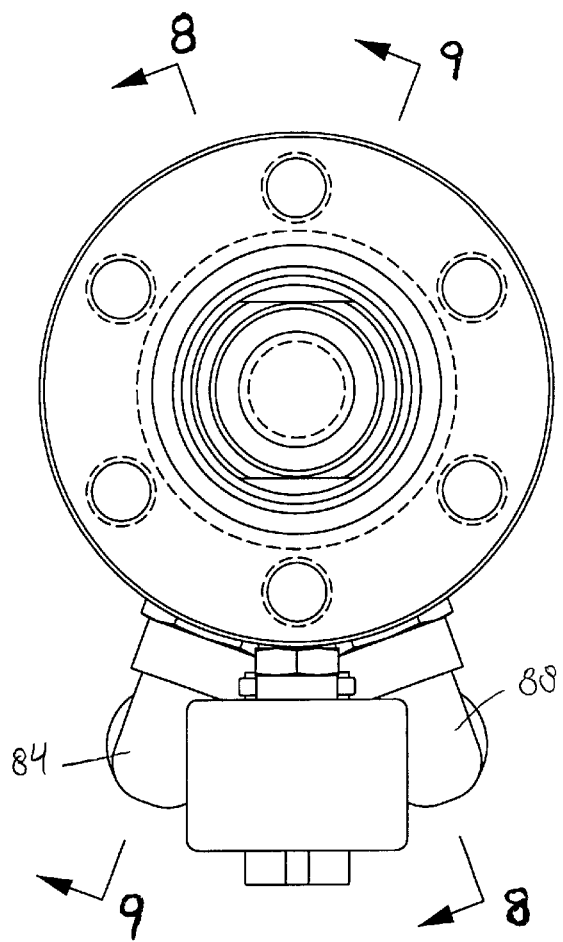
FIG. 7 is an end view of the pressure intensifier of the present invention.

To couple front cylinder 18 to rear cylinder 20, lobes 198 are aligned with recesses 212 and the cylinders are moved toward one another. At this time, lobes 198 are positioned within slot 214. Front cylinder 18 is then rotated relative to rear cylinder 20 ninety degrees to trap lobes 198 within slot 214, as shown in FIG. 6. A pair of set screws 216 interconnect front cylinder 18 with rear cylinder 20 and prevent inadvertent rotation of the cylinders relative to one another during operation of pressure intensifier 10.

Figure 5:
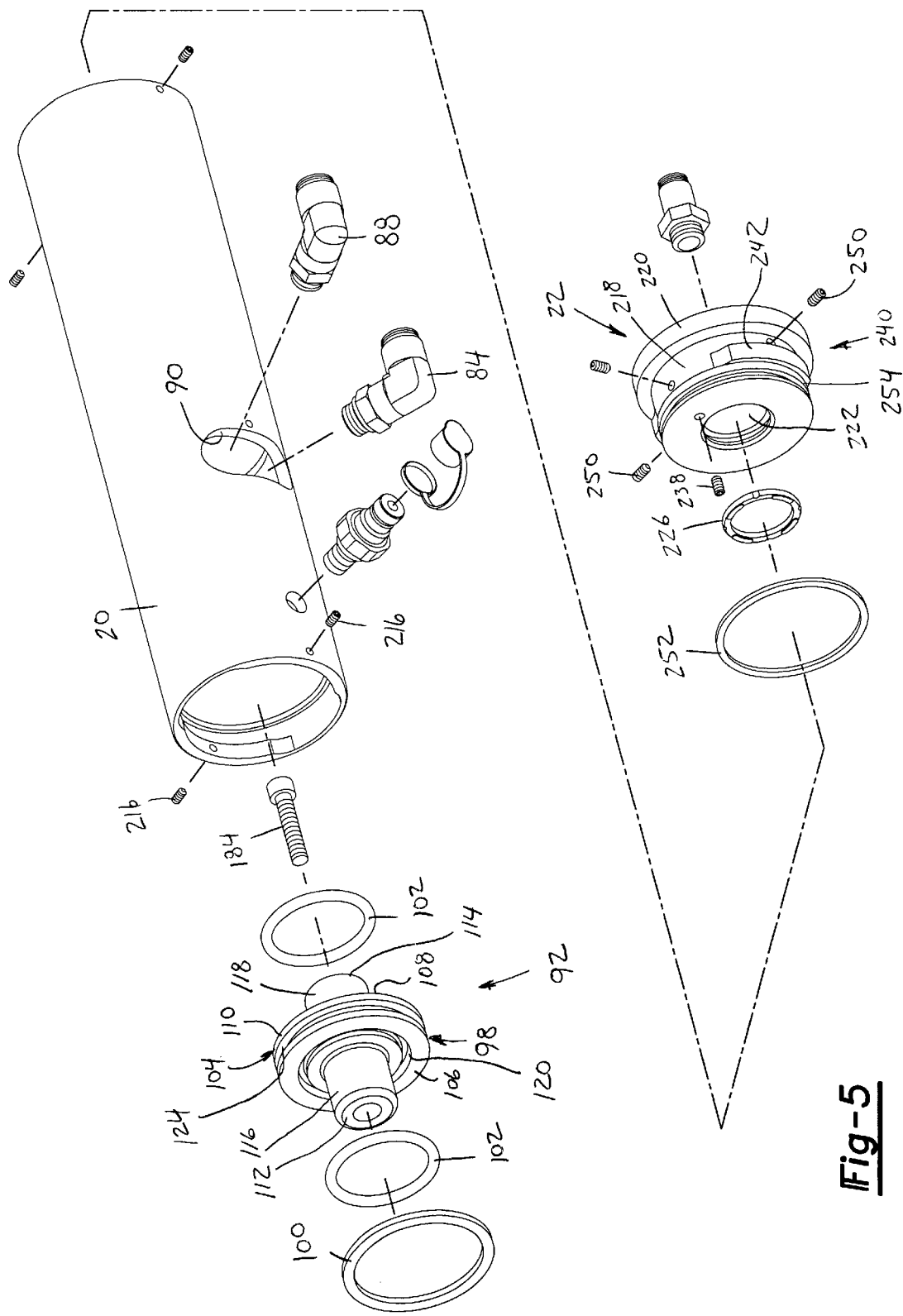
FIG. 5 is an enlarged perspective view of the encircled area of FIG. 2.

With reference to FIGS. 5 and 8, end cap 22 includes a generally cylindrical body 218, a flange 220 and a bore 222 extending into body 218. Bore 222 is sized for receipt of rear trunion 114 of first piston 98 when first piston 98 is in the fully retracted position. A piston seal 226 is positioned within bore 222 and contacts outer cylindrical surface 118 when first piston assembly 92 is in the retracted position. An inlet port 228 inwardly extends from a rear face 230 in communication with bore 222 and first cavity 28. Inlet port 228 is also in communication with a passageway 236 extending from bore 222 to a front face 237 of end cap 22. An orifice screw 238 is positioned within passageway 236 to limit the volumetric flow rate of air attempting to escape first cavity 28 as rear trunion 114 enters bore 222 during retraction of first piston assembly 92. Therefore, impact loading of first piston 98 against end cap 22 is avoided.

End cap 22 is coupled to rear cylinder 20 using a retention mechanism 240 similar to the retention mechanism used to couple front cylinder 18 to rear cylinder 20. Specifically, end cap 22 includes a pair of lobes 242 extending radially therefrom. Lobes 242 cooperate with a lip 244 to resist axial separation forces generated by pressurized fluid within the cavities.

Recesses (not shown) extend through lip 244. A slot 248 is positioned behind lip 244 to retain lobes 242. A pair of set screws 250 interconnects end cap 22 and rear cylinder 20 to prevent rotation of lobes 242 within slot 248. An end cap seal 252 is positioned within a groove 254 of end cap 22 to prevent compressed air from escaping first cavity 28.

Figure 10:
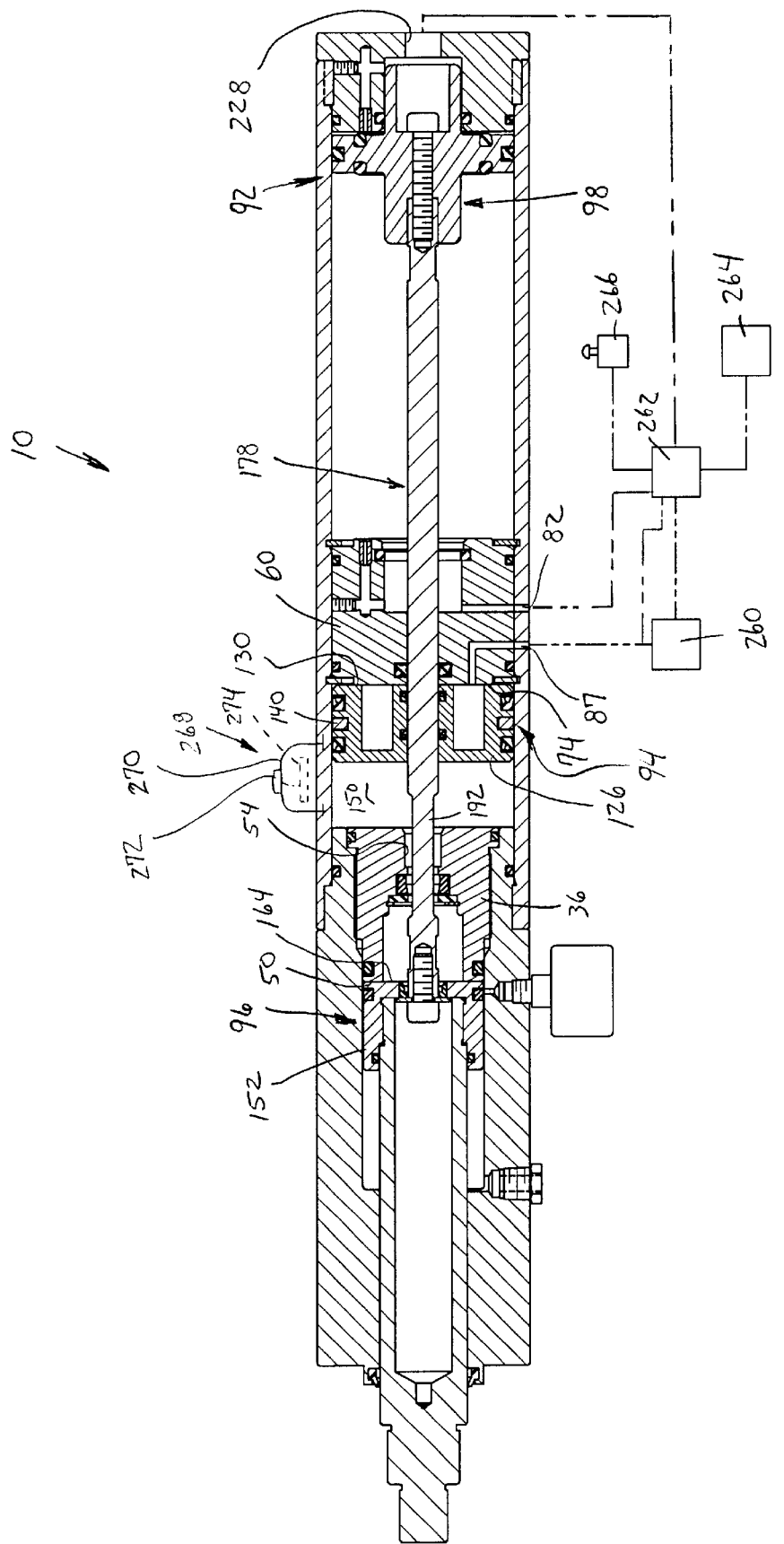
FIG. 10 is a cross-sectional view of the pressure intensifier having the first piston positioned in a fully retracted position.
Figure 11:
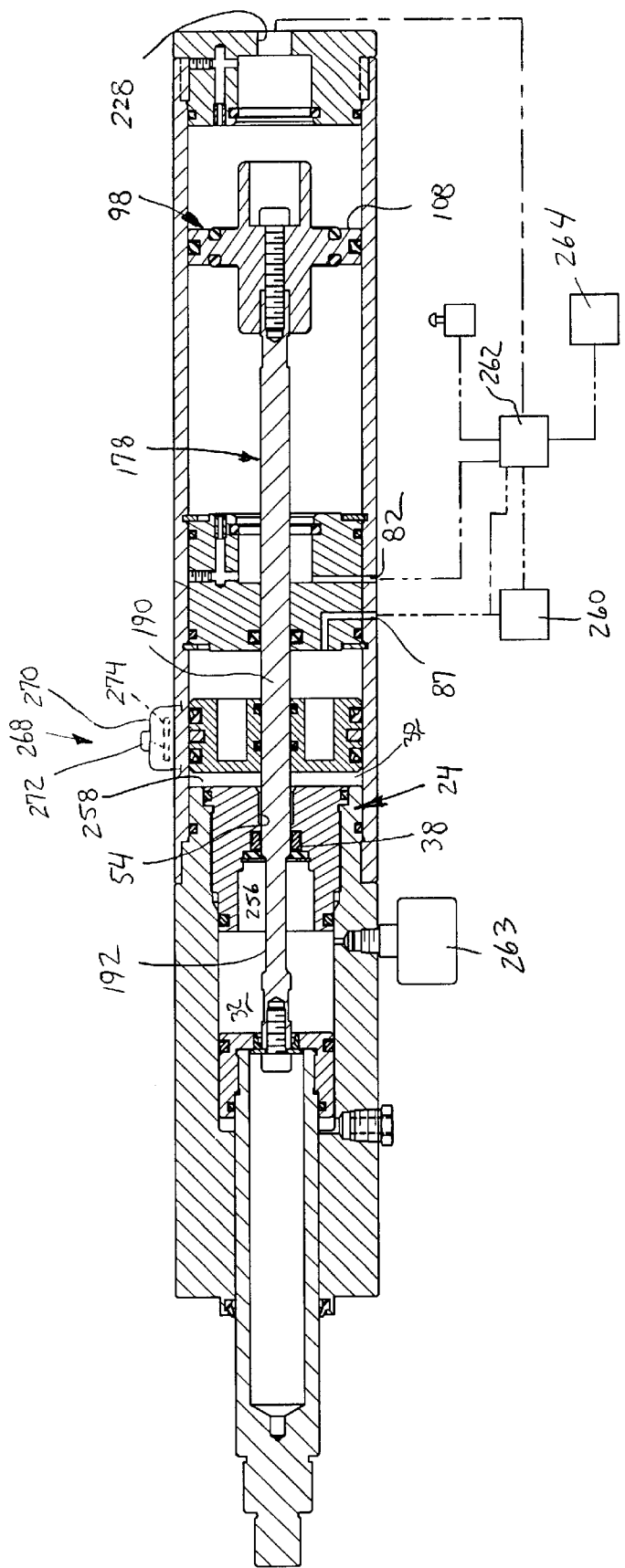
FIG. 11 is a cross-sectional view of the pressure intensifier showing the first piston positioned in an intermediate position.
Figure 12:
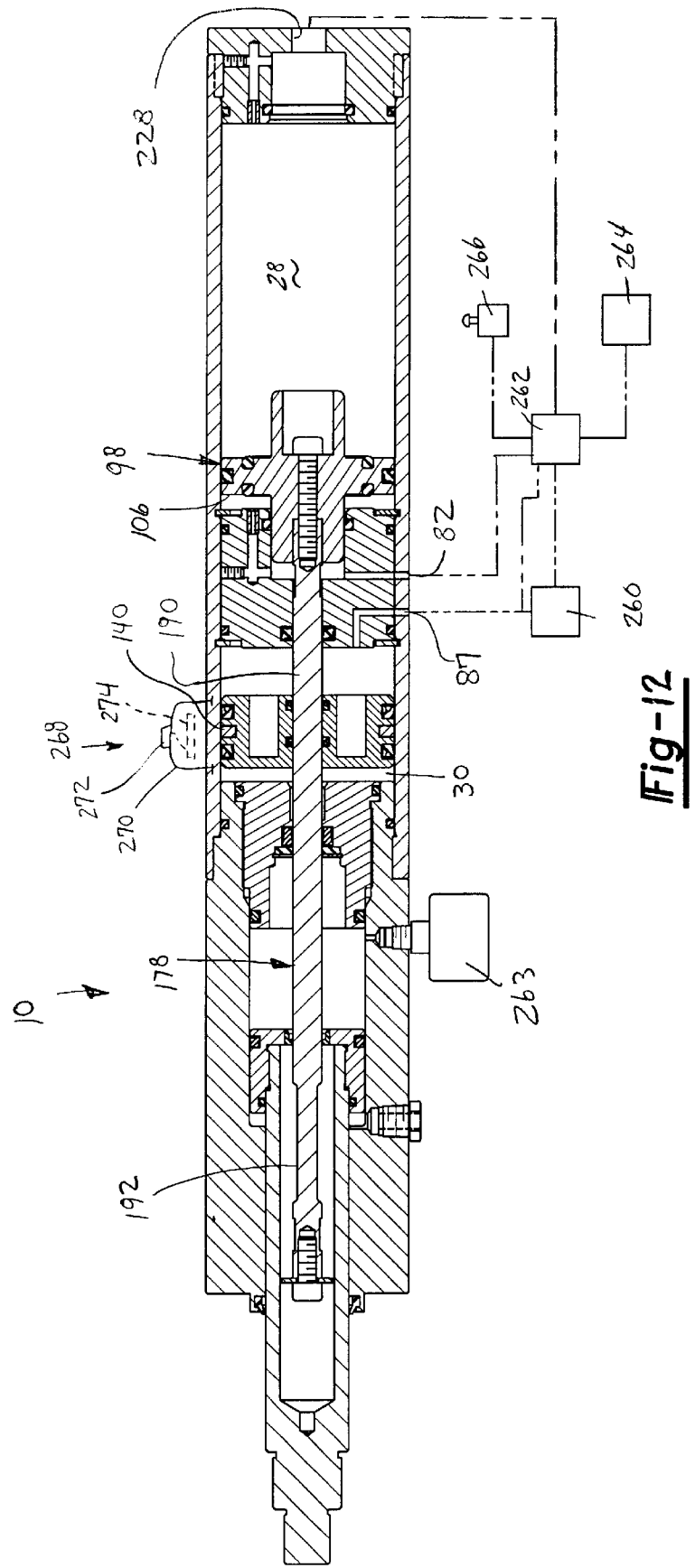
FIG. 12 is a cross-sectional view of the pressure intensifier showing the first piston in an advanced position.

With reference to FIGS. 10–12, operation of pressure intensifier 10 will now be described. FIG. 10 depicts first piston assembly 92 in the retracted position. At this time first port 82 is pressurized with compressed air at approximately 80 psi. Second port 87 and inlet port 228 are vented to atmosphere. It should be noted that second piston assembly 94 is in a retracted position having rear face 130 contacting front face 74 of bulkhead 60. Additionally, third piston assembly 96 is in a fully retracted position having rear face 164 of third piston 152 positioned adjacent front face 50 of divider 36.

To initiate movement of ram 14 in the advanced direction, first port 82 and inlet port 228 are vented to atmosphere during a first phase of actuation. Second port 87 is energized with pressurized air at approximately 80 psi. During the first phase of actuation, ram 14 is extended rapidly using relatively low force to cause tool 12 to contact work piece 16. The input pressure at second port 87 causes second piston 126 to axially move from right to left as shown in the Figures. As second piston 126 moves, the incompressible fluid located within portion 150 of second cavity 30 passes by necked portion 192 of rod 178 through passageway 54 of divider 36 causing third piston assembly 96 to move axially toward the extended position. Because rod 178 is coupled to third piston 96 via threaded fastener 184, rod 178 and first piston 98 translate to the position shown in FIG. 11.

At the end of phase one, necked portion 192 of rod 178 has fully traversed the area of divider assembly 24 including high pressure seal 38. As body portion 190 of rod 178 enters high pressure seal 38, a high pressure chamber 256 and a low pressure chamber 258 are formed. Hydraulic fluid may no longer freely flow through passageway 54.

A pressure valve 260 senses pressure at second port 87. Pressure valve 260 is plumbed in communication with a switching valve 262 which controls the condition of first port 82, second port 87 and inlet port 228. Each of the ports may be placed in a pressurized condition being supplied with approximately 80 psi or a vented condition allowing pressurized fluid to escape to atmosphere.

Once pressure valve 260 senses a pressure indicating that ram 14 has extended to cause tool 12 to contact work piece 16, switching valve 262 directs pressure intensifier 10 to commence phase two of the actuation. During phase two, pressurized air is supplied to second port 87 and inlet port 228 while first port 82 is instructed to remain vented to atmosphere. Pressure acting on rear face 108 of first piston 98 causes first piston 98 to translate to the advanced position shown in FIG. 12. Because body portion 190 of rod 178 is engaged with high pressure seal 38, entry of rod 178 within high pressure chamber 256 causes a very large force amplification due to the incompressibility of the fluid located within the high pressure chamber. A pressure gauge 263 is plumbed in communication with high pressure chamber 256 to provide an operator a visual indication of the hydraulic pressure generated during operation of pressure intensifier 10.

A timer valve 264 is plumbed in communication with switching valve 262. Timer valve 264 operates to assure that the intensified pressure reaches a maximum before switching valve 262 acts to retract ram 14. Once a predetermined time has elapsed for maximum pressure to be reached within high pressure chamber 256, timer valve 264 signals switching valve 262 to retract ram 14. At this time, second port 87 and inlet port 228 are vented to atmosphere while an 80 psi compressed air source is coupled to first port 82.

Pressurized fluid entering first port 82 acts on front face 106 of first piston 98 to generate a relatively large lifting force during retraction of ram 14. A large force may be produced because the area on which the pressurized fluid acts includes the entire cross-sectional area of first cavity 28 minus the relatively small cross-sectional area of rod 178. Accordingly, heavy equipment such as tool 12 may be lifted without assistance from external booster cylinders or other load lifting devices.

During retraction of rod 178, necked portion 192 clears high pressure seal 38 allowing washer 186 and threaded fastener 188 to axially displace third piston assembly 96 in the retracted direction. Oil passes from third cavity 32 to second cavity 30 through passageway 54. The transfer of fluid causes second piston assembly 94 to move in the retracted direction as well. First piston assembly 92 and rod 178 continue to retract until rear face 108 of first piston 98 contacts end cap 22. At this time, pressure intensifier 10 is in position to begin another actuation cycle.

It should be appreciated that any number of input signals may be used to start a given pressure intensifier sequence. For example, a typical two palm valve anti-repeat circuit 266 including an emergency stop valve may be implemented. An electrical system having an output fluid start-up may also be used. Alternatively, the start signal and control system may include electrically operated solenoid valves.

Pressure intensifier 10 includes an oil level detection system 268 including a reed switch 270, a light emitting diode 272, a battery 274 and magnetic ring 140. If the incompressible liquid level within second cavity 30 becomes low, magnetic ring 140 comes within sensing proximity of reed switch 270. Reed switch 270 closes causing electrical current from battery 274 to power light emitting diode 272. Accordingly, light emitting diode 272 provides an operator with a visual indication of low liquid level prior to pressure intensifier 10 becoming ineffective.

What is claimed is:

1. A pressure intensifier for supplying force to a work piece, the pressure intensifier comprising:

a housing;

first, second and third pistons slidably positioned in said housing;

a substantially incompressible fluid positioned between said second piston and said third piston; and a rod coupled to said first piston, said first piston and rod slidably drivable between an advanced position and a retracted position by a fluid power source, said rod cooperating with a seal to selectively capture said substantially incompressible fluid in a high pressure chamber, wherein a first side of said first piston is selectively powered to drive said rod into said high pressure chamber thereby producing an amplified force on said third piston, and wherein a second side of said first piston is selectively pressurized to drive said rod toward said retracted position, wherein said rod includes a first portion and a second reduced portion, wherein said first portion is selectively engageable with said seal to capture said substantially incompressible fluid in said high pressure chamber, and wherein said second reduced portion of said rod is selectively positionable proximate said seal to allow said substantially incompressible fluid to exit and enter said high pressure chamber.

2. A pressure intensifier for supplying force to a work piece, the pressure intensifier comprising:

a housing;

first, second and third pistons slidably positioned in said housing;

a substantially incompressible fluid positioned between said second piston and said third piston;

a rod coupled to said first piston, said first piston and rod slidably drivable between an advanced position and a retracted position by a fluid power source, said rod cooperating with a seal to selectively capture said substantially incompressible fluid in a high pressure chamber, wherein a first side of said first piston is selectively powered to drive said rod into said high pressure chamber thereby producing an amplified force on said third piston, and wherein a second side of said first piston is selectively pressurized to drive said rod toward said retracted position; and a fluid control system including a pressure valve in communication with said second piston and a switching valve, said pressure valve selectively signaling said switching valve to couple said fluid power source to said second side of said first piston to retract said rod and said first piston once a predetermined pressure threshold has been met.

3. A pressure intensifier comprising:

a housing defining a first cavity and a second cavity, said second cavity containing a substantially incompressible fluid, said first cavity being selectively pressurized by a fluid source;

a first piston slidably positioned within said first cavity, said first piston having a first side and an opposite second side;

an intensifier rod coupled to said first piston, said intensifier rod extending from said first cavity to said second cavity; and a ram assembly slidably positioned within said second cavity, said ram assembly being selectively movable in an advancing direction to provide an amplified output force in response to pressurizing said first side of said first piston and moving said intensifier rod into said second cavity, and wherein said ram assembly is selective movable in a retracting direction in response to pressurizing said second side of said first piston.

4. The pressure intensifier of claim 3 wherein said intensifier rod includes a first portion for selectively partitioning said second cavity into a high pressure chamber and a low pressure chamber, wherein the axial position of said intensifier rod determines when said substantially incompressible fluid may flow between said low pressure chamber and said high pressure chamber.

5. The pressure intensifier of claim 4 further including a second piston to move said substantially incompressible fluid between said low pressure chamber and said high pressure chamber.

6. The pressure intensifier of claim 5 wherein said amplified force is provided when said first portion of said intensifier rod engages a seal to partition said second cavity into said high pressure chamber and when said first side of said first piston is pressurized.

7. The pressure intensifier of claim 6 wherein said intensifier rod includes a second portion shaped to less than completely engage said seal thereby allowing said substantially incompressible fluid to pass between said high pressure chamber and said low pressure chamber.

8. The pressure intensifier of claim 7 further including a fluid control system for selectively supplying pressurized fluid to said first and second cavities.

9. The pressure intensifier of claim 8 wherein said fluid control system includes a pressure valve in communication with a switching valve, said pressure valve selectively signaling said switching valve to couple said fluid source to said first piston once a predetermined pressure threshold has been met.

10. The pressure intensifier of claim 9 further including a timer valve in communication with said switching valve, said timer valve requiring said switching valve to maintain pressure on said first side of said first piston for a predetermined amount of time.

11. A pressure intensifier for supplying force to a work piece, the pressure intensifier comprising:

a housing including a first cavity, a second cavity and third cavity, a first passageway interconnecting said first cavity and said second cavity, and a second passageway interconnecting said second cavity and said third cavity;

a first piston slidably positioned in said first cavity, a second piston slidably positioned in said second cavity, said second piston including an aperture extending therethrough;

a third piston slidably positioned in said third cavity, said third piston including an internal chamber and a bore, said bore communicating with said internal chamber;

a substantially incompressible fluid contained within said second cavity, said third cavity and said internal chamber;

a rod coupled to said first piston, said rod slidably movable in an advancing direction and a retracting direction, said rod positioned within said first passageway, said second passageway, said bore, said second piston and said third piston, said rod including a first portion having a diameter and a second portion having a reduced diameter, said reduced diameter selectively positioned within said second passageway to allow said substantially incompressible fluid to flow between said second and third chambers when said third piston is disengaged from the work piece, wherein said first portion of said rod is positioned within said second passageway to block flow of said substantially incompressible fluid between said second and third chambers when said third piston is engaged with the work piece, and wherein said first piston is selectively drivable by a compressed fluid in said advancing and retracting directions.

12. The pressure intensifier of claim 11 wherein said second chamber is selectively pressurizable to move said second piston toward said third piston and transfer at least a portion of said substantially incompressible fluid from said second cavity to said third cavity.

13. The pressure intensifier of claim 12 further including a fluid control system for selectively supplying pressurized fluid to said first and second pistons.

* * * * *

UNITED STATES PATENT AND TRADEMARK OFFICE
CERTIFICATE OF CORRECTION

PATENT NO. : 6,735,944 B2
DATED : May 18, 2004
INVENTOR(S) : Edwin G. Sawdon

It is certified that error appears in the above-identified patent and that said Letters Patent is hereby corrected as shown below:

Column 4,
Line 50, "complimentary" should be -- complementary --.
Line 54, "compliment" should be -- complement --.

Column 7, Line 67 through Column 8, line 1,
"selective" should be -- selectively --.

Signed and Sealed this

Seventeenth Day of August, 2004

JON W. DUDAS
*Acting Director of the United States Patent and Trademark Office*